United States Patent
Hoke et al.

(10) Patent No.: US 10,184,835 B2
(45) Date of Patent: Jan. 22, 2019

(54) HIGH DYNAMIC RANGE INFRARED IMAGING SPECTROSCOPY

(71) Applicant: Agilent Technologies, Inc., Santa Clara, CA (US)

(72) Inventors: Charles Hoke, Menlo Park, CA (US); Christopher Ryan Moon, Los Gatos, CA (US); Andrew Ghetler, San Jose, CA (US); Yang Han, Sunnyvale, CA (US)

(73) Assignee: Agilent Technologies, Inc., Santa Clara, CA (US)

( * ) Notice: Subject to any disclaimer, the term of this patent is extended or adjusted under 35 U.S.C. 154(b) by 410 days.

(21) Appl. No.: 14/863,225

(22) Filed: Sep. 23, 2015

(65) Prior Publication Data

US 2017/0082490 A1    Mar. 23, 2017

(51) Int. Cl.
| | |
|---|---|
| *G01J 3/28* | (2006.01) |
| *G01J 3/02* | (2006.01) |
| *G01J 3/10* | (2006.01) |
| *G01J 3/42* | (2006.01) |

(52) U.S. Cl.
CPC ........... *G01J 3/2823* (2013.01); *G01J 3/0213* (2013.01); *G01J 3/0224* (2013.01); *G01J 3/108* (2013.01); *G01J 3/28* (2013.01); *G01J 3/42* (2013.01)

(58) Field of Classification Search
CPC ......... G01J 3/0224; G01J 3/108; G01J 3/2823
USPC ............... 250/339.07, 458.1, 205, 492.1
See application file for complete search history.

(56) References Cited

U.S. PATENT DOCUMENTS

| | | | | |
|---|---|---|---|---|
| 5,343,308 A | * | 8/1994 | Johnston | H04N 1/028 358/445 |
| 5,420,635 A | * | 5/1995 | Konishi | H04N 3/1587 348/229.1 |
| 6,075,235 A | * | 6/2000 | Chun | G01J 4/04 250/208.1 |

(Continued)

FOREIGN PATENT DOCUMENTS

| | | |
|---|---|---|
| EP | 1422660 A2 | 5/2004 |
| GB | 2331426 A | 5/1999 |

OTHER PUBLICATIONS

Guo, B. et al., "Laser-based mid-infrared reflectance imaging of biological tissues", 2004, Optics Express 12(1), pp. 208-219.*

(Continued)

*Primary Examiner* — David Porta
*Assistant Examiner* — Blake Riddick

(57) ABSTRACT

An imaging scanner and a method for using the same are disclosed. The scanner includes a variable attenuator adapted to receive a light beam generated by a MIR laser and that generates an attenuated light beam therefrom characterized by an attenuation level. The scanner includes an optical assembly that focuses the attenuated light beam to a point on a specimen. A light detector measures an intensity of light leaving the point on the specimen, the light detector being characterized by a detector dynamic range. A controller forms a plurality of MIR images from the intensity as a function of position on the specimen, each of the plurality of MIR images being formed with a different level of attenuation of the light beam. The controller combines the plurality of MIR images to generate a combined MIR image having a dynamic range greater than the detector dynamic range.

12 Claims, 3 Drawing Sheets

(56) References Cited

U.S. PATENT DOCUMENTS

| | | | | |
|---|---|---|---|---|
| 6,075,613 | A * | 6/2000 | Schermer | G01N 21/274 356/213 |
| 6,108,081 | A * | 8/2000 | Holtom | G01J 3/44 356/301 |
| 6,392,794 | B1 * | 5/2002 | Engelhardt | G02B 21/0032 359/368 |
| 6,400,885 | B1 * | 6/2002 | Hu | G02B 6/266 385/140 |
| 6,490,043 | B1 * | 12/2002 | Kebabian | G01J 3/2823 356/453 |
| 6,501,504 | B1 * | 12/2002 | Tatko | H04N 5/235 348/229.1 |
| 6,959,133 | B2 * | 10/2005 | Vancoill | G02B 6/4204 385/140 |
| 7,606,484 | B1 | 10/2009 | Richards | |
| 8,134,698 | B1 * | 3/2012 | Wolters | G01N 21/9501 356/237.1 |
| 9,188,874 | B1 * | 11/2015 | Johnson | G03F 7/70291 |
| 9,606,002 | B2 * | 3/2017 | Bird | G01J 3/10 |
| 9,651,426 | B2 * | 5/2017 | Kleczewski | G01J 4/02 |
| 2002/0159011 | A1 * | 10/2002 | Ikeno | G02F 1/133553 349/113 |
| 2003/0198272 | A1 * | 10/2003 | Nishioka | G01N 21/6456 372/101 |
| 2004/0008267 | A1 | 1/2004 | Chen | |
| 2004/0184007 | A1 * | 9/2004 | Silverstein | G02B 13/22 353/20 |
| 2005/0023356 | A1 * | 2/2005 | Wiklof | G06K 7/10851 235/462.42 |
| 2006/0016997 | A1 * | 1/2006 | Siegel | G01N 21/3581 250/339.11 |
| 2006/0169904 | A1 * | 8/2006 | Grobmyer | G01N 21/21 250/341.4 |
| 2007/0013898 | A1 * | 1/2007 | Wolters | G01N 21/9501 356/237.2 |
| 2007/0081815 | A1 * | 4/2007 | Zomet | G03B 11/00 396/327 |
| 2007/0127529 | A1 * | 6/2007 | Shaw | F41G 7/00 372/3 |
| 2009/0122317 | A1 * | 5/2009 | Ito | G01J 3/02 356/440 |
| 2010/0243891 | A1 * | 9/2010 | Day | B82Y 20/00 250/330 |
| 2010/0268042 | A1 * | 10/2010 | Wang | A61B 5/0059 600/322 |
| 2010/0302399 | A1 * | 12/2010 | Lin | G06T 5/009 348/222.1 |
| 2011/0080581 | A1 * | 4/2011 | Bhargava | G01J 3/02 356/302 |
| 2012/0133928 | A1 * | 5/2012 | Urano | G01N 21/9501 356/237.2 |
| 2012/0205519 | A1 * | 8/2012 | Mohler | G01J 1/20 250/206 |
| 2012/0229815 | A1 * | 9/2012 | Langholz | G01N 21/6458 356/601 |
| 2013/0026368 | A1 * | 1/2013 | Herzinger | G01J 4/04 250/341.3 |
| 2013/0258343 | A1 * | 10/2013 | Zhu | G01N 21/31 356/403 |
| 2013/0301042 | A1 * | 11/2013 | Urano | G01N 21/9501 356/237.5 |
| 2015/0034612 | A1 * | 2/2015 | Hosseini | B23K 26/0069 219/121.61 |
| 2015/0109432 | A1 * | 4/2015 | Dixon | G01N 21/6456 348/79 |
| 2015/0172631 | A1 * | 6/2015 | Kasahara | H04N 5/3572 348/46 |
| 2015/0276391 | A1 * | 10/2015 | Murase | G01B 11/26 356/138 |
| 2016/0091704 | A1 * | 3/2016 | Hoke | G02B 21/002 348/79 |
| 2016/0169747 | A1 * | 6/2016 | Weida | G01J 5/0896 250/332 |
| 2016/0231547 | A1 * | 8/2016 | Kubo | G02B 21/008 |
| 2017/0003166 | A1 * | 1/2017 | Ghetler | G01J 3/108 |
| 2017/0003170 | A1 * | 1/2017 | Kleczewski | G01J 4/02 |
| 2017/0059408 | A1 * | 3/2017 | Korner et al. | G01B 11/2536 |
| 2017/0085769 | A1 * | 3/2017 | Tanaka | H04N 5/2355 |
| 2017/0214924 | A1 * | 7/2017 | Su | H04N 19/187 |

OTHER PUBLICATIONS

Said, A.A. and Singh, N.B., "Laser Induced Damage to Thallium Arsenic Selenide (TAS)", 1990, Proc. SPIE 1438, Laser-Induced Damage in Optical Materials 1989, 143809.*

UK Search Report dated Feb. 24, 2017, Application No. GB1615883.4.

* cited by examiner

2

HIGH DYNAMIC RANGE INFRARED IMAGING SPECTROSCOPY

BACKGROUND

Quantum cascade lasers provide a tunable mid-infrared (MIR) light source that can be used for spectroscopic measurements and images. Many chemical components of interest have molecular vibrations that are excited in the MIR region of the optical spectrum, which spans wavelengths between 5 to 25 microns. Hence, measuring the absorption of MIR light at various locations on a sample can provide useful information about the chemistry of the sample as a function of position on the sample.

One class of imaging spectrometers measures the light reflected from the sample as a function of position on the sample and wavelength of the illuminating MIR light. In many samples of interest, the range of reflectivities observed across the sample presents challenges as the dynamic range of the detectors is insufficient to measure the reflected light with sufficient accuracy.

SUMMARY

The present invention includes an imaging scanner and a method for using the same. The scanner includes a variable attenuator adapted to receive a light beam generated by an MIR laser and that generates an attenuated light beam therefrom characterized by an attenuation level. The scanner also includes an optical assembly that focuses the attenuated light beam to a point on the specimen that is carried on a stage. A light detector measures an intensity of light leaving the point on the specimen, the light detector being characterized by a detector dynamic range. A controller forms a plurality of MIR images from the intensity as a function of position on the specimen, each of the plurality of MIR images being formed with a different level of attenuation of the light beam. The controller combines the plurality of MIR images to generate a combined MIR image having a dynamic range greater than the detector dynamic range.

In one aspect of the invention, each of the plurality of MIR images includes a plurality of pixels, each pixel derived from the intensity at a different location on the specimen. Each pixel is characterized by an intensity value that is either within the detector dynamic range or outside the detector dynamic range, the combined MIR image excluding pixels that are outside the detector dynamic range.

In another aspect of the invention, the controller averages pixels derived from the same location on the specimen in different MIR images if the pixels correspond to intensity values that are within the detector dynamic range to generate the combined MIR image and excludes pixels that are outside the detector dynamic range.

In another aspect of the invention, the controller sets the attenuation level in a second one of the plurality of MIR images based on pixels that are outside of the detector dynamic range in a first one of the plurality of MIR images that has already been formed.

In yet another aspect of the invention, the optical assembly includes a scanning assembly having a focusing lens that focuses the light beam to the point and a mirror that moves in a first direction relative to the stage such that the focusing lens maintains a fixed distance between the focusing lens and the stage, the stage moving in a direction orthogonal to the first direction. The controller forms a line image from the intensity as a function of position on the specimen along the first direction. In another aspect, the plurality of MIR images are a plurality of the line images formed at a first stage position.

In another aspect of the invention, the variable attenuator includes first and second wire-grid polarization filters. The first wire-grid polarization filter is characterized by a first linear polarization pass direction and a first actuator for causing the first linear polarization pass direction to rotate relative to the light beam. The first wire-grid polarization filter is positioned such that the light beam passes through the first wire-grid polarization filter. The second wire-grid polarization filter is characterized by a second linear polarization pass direction and a second actuator for causing the second linear polarization pass direction to rotate relative to the light beam. The second wire-grid polarization filter is positioned such that the light beam passes through the second wire-grid polarization filter after passing through the first wire-grid polarization filter.

In another aspect of the invention, the first wire-grid polarization filter includes a parallel grid of metallic lines on a first transparent planar substrate. The first transparent planar substrate is angled relative to the light beam such that light reflected from the first wire-grid polarization filter does not propagate in a direction parallel to the light beam.

DETAILED DESCRIPTION

Figure 1:
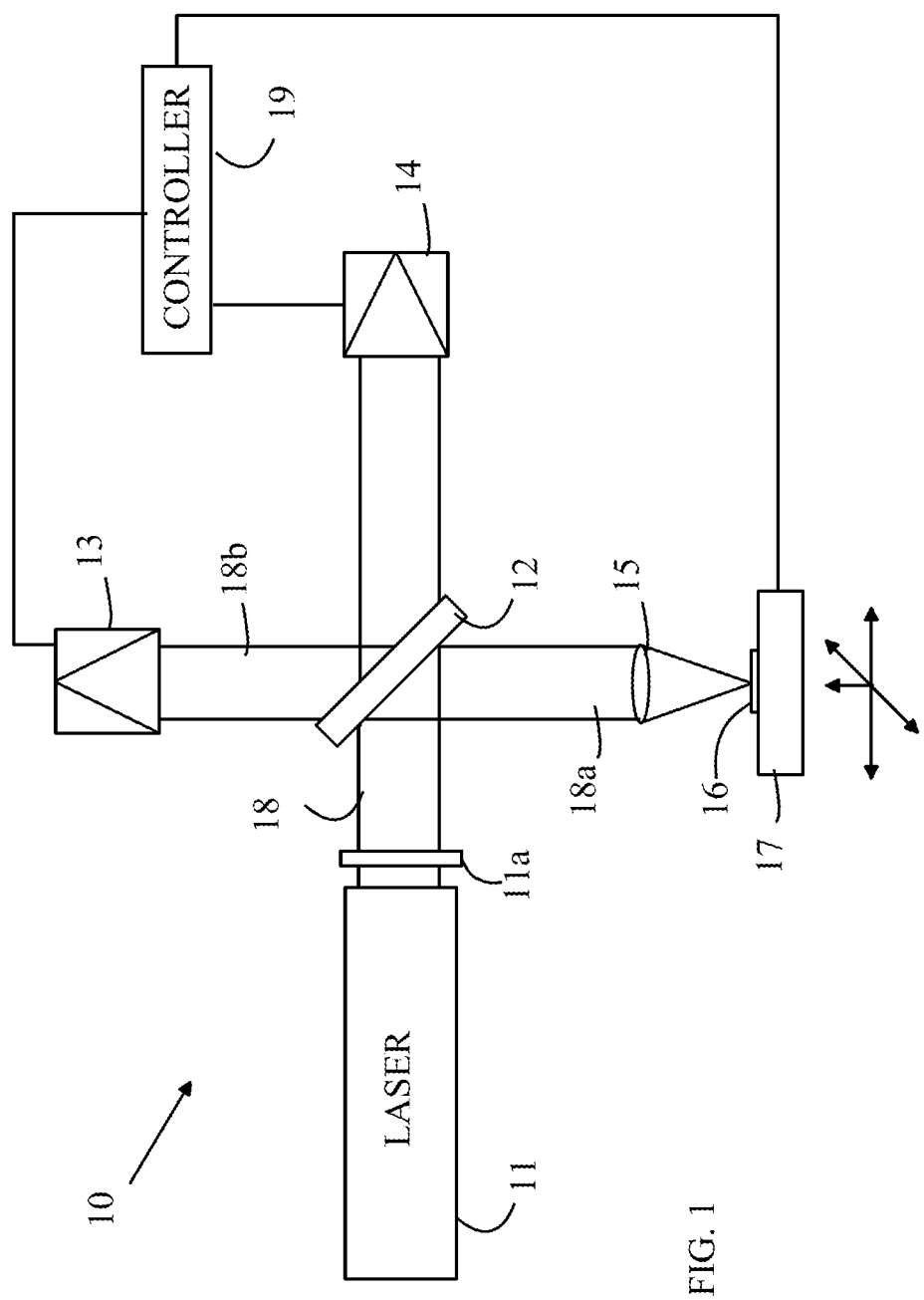
FIG. 1 illustrates one embodiment of an MIR imaging system according to the present invention.

The manner in which the present invention provides its advantages can be more easily understood with reference to FIG. 1 which illustrates one embodiment of an MIR imaging system according to the present invention. Imaging system 10 includes a quantum cascade laser 11 that generates a collimated light beam 18 having a narrow band of wavelengths in the MIR. In one aspect of the invention, quantum cascade laser 11 is a quantum cascade laser having a tunable wavelength that is under the control of a controller 19. The intensity of light from quantum cascade laser 11 is controlled by a variable attenuator 11a that is also under the control of controller 19. Collimated light beam 18 is split into two beams by a partially reflecting mirror 12. Light beam 18a is directed to a lens 15 that focuses that beam onto a specimen 16 that is mounted on xyz-stage 17 that can position specimen 16 relative to the focal point of lens 15. Light that is reflected back from specimen 16 is collimated into a second beam that has a diameter determined by the aperture of lens 15 and returns to partially reflecting mirror 12 along the same path as light beam 18a. While the first and second beams are shown as having the same cross-section in FIG. 1, it is to be understood that the second beam could have a different cross-section than the first beam. A portion of the second beam is transmitted through partially reflecting mirror 12 and impinges on a first light detector 13 as shown at 18b. Light detector 13 generates a signal related to the intensity of light in beam 18b. Controller 19 computes an image as a function of position on specimen 16 by moving specimen 16 relative to the focal point of lens 15 using xyz-stage 17.

Controller 19 must be able to determine the beam intensity of the light in collimated light beam 18 to compute the reflectivity of the point on the sample currently being measured. The intensity of the light from quantum cascade laser 11 can vary by more than an order of magnitude with wavelength. In addition, there can be variations over time at any given wavelength. In one aspect of the invention, controller 19 also monitors the beam intensity of the light in collimated light beam 18 using a second light detector 14 that receives a portion of the light generated by quantum cascade laser 11 through partially reflecting mirror 12. Quantum cascade laser 11 is typically a pulsed source. The intensity of light from pulse to pulse can vary significantly, and hence, the pixels of the image are corrected for the variation in intensity by dividing the intensity measured by light detector 13 by the intensity measured by light detector 14. In addition, since the light intensity from quantum cascade laser 11 is zero between pulses, controller 19 only sums the ratio of intensities from light detectors 13 and 14 during those times at which the output of light detector 14 is greater than some predetermined threshold. This aspect of the present invention improves the signal-to-noise ratio of the resultant image, since measurements between pulses contribute only noise, which is removed by not using measurements between pulses. If the output of quantum cascade laser 11 is stable over time and from pulse to pulse, then second light detector 14 can be replaced by a calibration procedure that measures the intensity of the output of quantum cascade laser 11 as a function of wavelength.

The range of reflectivities encountered on many specimens exceeds the dynamic range of light detector 13. A sample having a metallic area on its surface has a reflectivity at such an area that is orders of magnitude greater than an area that is transparent. The dynamic range of the detector is determined by the sensitivity of the detector and noise in the detector. In general, there is a minimum signal that can be measured with a desired accuracy in the presence of the system noise and a maximum signal that can be measured without saturating the detector. The ratio of the maximum to minimum signals is often referred to as the dynamic range of the detector. Similarly, a sample can exhibit minimum and maximum reflectivities. If the dynamic range of the sample reflectivities is within the dynamic range of the detector, the intensity of light from quantum cascade laser 11 can be adjusted via variable attenuator 11*a* such that an accurate image of the entire image surface can be obtained. However, if the dynamic range of the sample reflectivities exceeds that of the detector, an accurate image of the sample surface cannot be obtained at all locations.

In principle, variable attenuator 11*a* could be adjusted at each sample location and wavelength to maintain the signal at light detector 13 within some predetermined range in which the signal can be measured and digitized with the desired accuracy. However, such an approach slows the measurement processes, and hence, is not preferred. In addition, such point by point adjustments are not practical in systems in which one dimension of the scanning is performed using a rapidly moving lens assembly.

Figure 2:
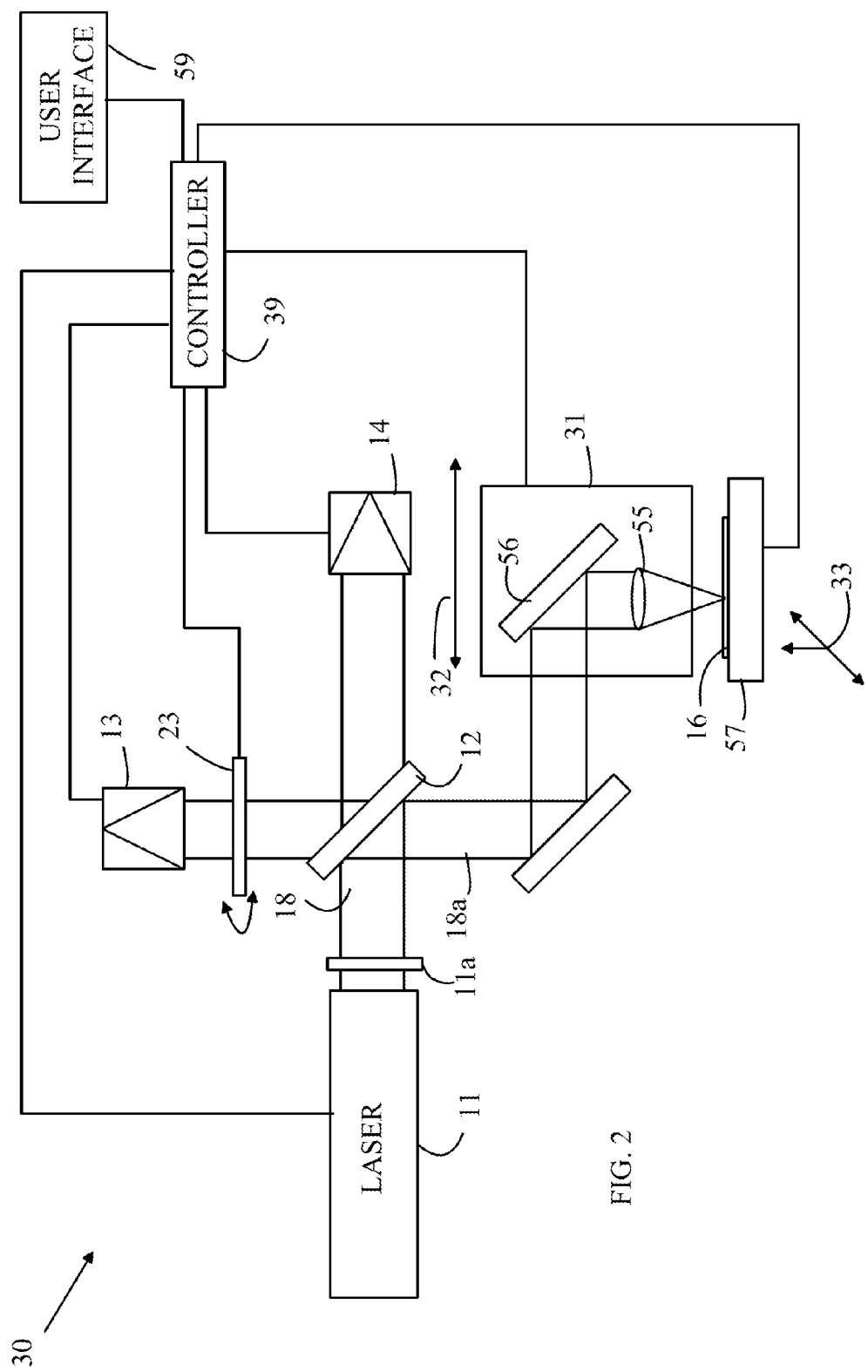
FIG. 2 illustrates another embodiment of an imaging system according to the present invention.

In the above described embodiments, the stage moves the sample in two dimensions during the generation of an image. The lateral extent of an image can be as small as a single pixel or as large as the entire specimen being scanned. However, the stage has a significant mass, and hence, the speed at which the sample is imaged is limited by the motion of the stage. In embodiments in which rapid imaging time is important, embodiments in which the specimen is scanned in one direction by moving lens 15 are preferred. Refer now to FIG. 2, which illustrates another embodiment of an imaging system according to the present invention. In imaging system 30, the stage assembly is divided into two components. Component 31 includes focusing lens 55 and is moveable in a direction shown at 32 such that a single line of the image is generated with each pass of component 31. Since focusing lens 55 and mirror 56 have a mass that is small compared to stage 57, component 31 can be moved with much greater speed. In one embodiment, component 31 is mounted on a rail and moved in a manner analogous to a print head on an inkjet printer. Stage 57 includes the mounting mechanism for the specimen being scanned and moves in a direction 33 that is orthogonal to direction 32. Since stage 57 only needs to move once per scan line, the slower speed of motion associated with the more massive stage 57 is acceptable. Controller 39 controls the wavelength of quantum cascade laser 11, the axis of linear polarization filter 23, the position of component 31, the wavelength of the output of quantum cascade laser 11 and the attenuation provided by variable attenuator 11*a*.

Component 31 preferably moves at speeds that are too fast to allow the intensity of light in collimated light beam 18 to be adjusted at each point of interest on the specimen. Hence, adjusting the intensity of the incident light on the specimen during a scan line is not preferred. In one aspect of the invention, the intensity of the incident light is maintained at a fixed value for an entire image of the specimen. The intensity is then adjusted based on the results of the first image and a second image is obtained. For example, if the first image included pixels in which light detector 13 was saturated, the second image would be formed with the output of quantum cascade laser 11 attenuated more than was the case in the first image. If the second image also included pixels that were still saturated, a third image can be taken with even more attenuation of the output of quantum cascade laser 11. Similarly, if the first image included pixels having intensities that were too low and hence dominated by noise, another image at a lower attenuation factor is generated to capture the information in the underexposed pixels. The plurality of images are then combined to provide a high dynamic range image of the specimen. In the following discussion, each image will be referred to as a frame.

In one aspect of the invention, pixels that are too low in each frame (consistent with the detector noise floor) or too high (where the detector is saturated or nonlinear) are first discarded. The detector output is then corrected to account for any nonlinearity in the detector response so that each pixel is now represented by a value that is a linear function of the light intensity reflected from the corresponding location in the specimen. Next, the intensity at each pixel is divided by the incident light intensity to obtain a reflectance at each pixel. The incident light intensity is determined by calibrating the attenuator. Variations in brightness of the source are removed by normalizing the output of light detector 13 to the output of light detector 14. Finally, the frames are averaged together pixel by pixel to provide an extended dynamic range image. The averaging can be weighted by the estimated noise contribution to each pixel in each frame. The final extended dynamic range image can be displayed on user interface 59.

In the above-described embodiments, a number of images of the entire specimen are generated and then combined. However, the same methodology can be performed on each scan line separately. In this case, each scan line can be treated as a separate "image". After the extended dynamic range image is generated for the current scan line, stage 57 is moved to a new scan line position, and the process is repeated. At the end of each pass of component 31, controller 39 can compute the reflectance for each pixel in the scan line. If the data indicated that pixels in the scan line are over or underexposed, variable attenuator 11a can be adjusted accordingly and another scan of the specimen performed along the scan line in question. The individual measurements for the line in question can then be combined to provide a high dynamic range image of the line on the specimen that is independent of the attenuator settings. When completed, controller 39 can move stage 57 to the next scan line position.

The range of reflectivities in a single line on the specimen is typically less than the range over the entire specimen. Hence, the number of individual exposures needed, on average, to compute the reflectivities without loss of information due to over or underexposure is significantly less than the number needed if the entire image is generated at exposure. In many cases, a single exposure of a line on the specimen will provide all the needed information. Hence, treating each scan line individually can provide significant reductions in the time needed to generate an image of the entire specimen.

It is advantageous to minimize the number of exposures that are needed to generate valid reflectivity measurements for all points in the image. The optimum difference in illumination intensity between two exposures depends on the dynamic range of light detector 13. Consider a pixel that is just overexposed at a first light intensity in collimated light beam 18, i.e., the light reflected from the pixel is just sufficient to saturate light detector 13. In this case, the next exposure should be at an incident light intensity that is less than the first intensity such that the pixel now generates a signal that is sufficient to detect the light from the specimen but less than the first exposure. The maximum useable change in the intensity for this pixel is achieved when the new signal is just at the lower boundary of the dynamic range of light detector 13. Hence, the larger the dynamic range of the detector, the greater the difference in illumination levels that can be used between exposures.

In the above-described embodiments, the different exposure levels are obtained by varying the attenuation level introduced by variable attenuator 11a. In principle, the different exposure levels could be provided by varying the power from quantum cascade laser 11. However, increasing the light output by increasing the current through the gain chip in the laser can alter the average wavelength generated by the laser due to mode hopping. In addition, small changes in the angle at which the light leaves the laser can also accompany such mode hopping. Hence, altering the output power of the laser is not preferred.

As noted above, quantum cascade laser 11 is operated in a pulse mode. In principle, altering the pulse rate could also be used to alter the exposure. However, changing the pulse rate also leads to artifacts due to increases in the average power dissipated in the gain chip and the resulting heating of the gain chip.

Finally, the exposure could be altered by changing the dwell time at each location on the specimen. In embodiments in which the sample is scanned one line at a time using moving component 31, the maximum rate at which the assembly can be moved limits this approach. Hence, varying an attenuation level is preferred.

As noted above, the exposure levels are preferably set by changing the attenuation provided by variable attenuator 11a. Since the exposure levels needed to provide complete coverage of the reflectivity are not known in advance, an attenuator that provides a continuously variable level of attenuation is preferred. In addition, it is also advantageous to be able to control the direction of polarization of the light that illuminates the specimen. Accordingly, an attenuator that also provides a continuously variable direction of polarization for the light leaving the attenuator is preferred. Quantum cascade laser 11 generates linearly polarized light. Hence, an attenuator that is also a polarization rotator is preferred.

Figure 3:
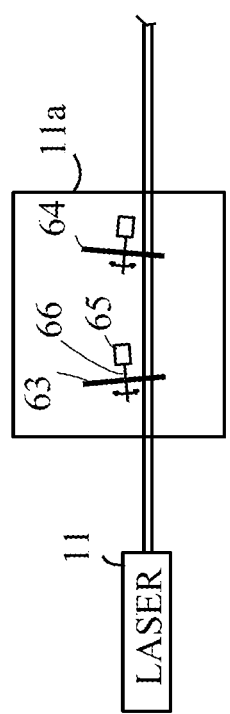
FIG. 3 illustrates one embodiment of an attenuator according to the present invention.

Refer now to FIG. 3, which illustrates one embodiment of an attenuator according to the present invention. To simplify the following discussion, a polarization filter that passes light having a particular linear polarization while reflecting or absorbing light having other linear polarizations will be referred to as a polarizer. Variable attenuator 11a includes first and second wire-grid polarizers 63 and 64, respectively. Each wire-grid polarizer has a pattern of parallel metallic lines disposed on a substrate that is transparent to the wavelength of light of the linearly polarized light. Linearly polarized light that is properly aligned with the direction of the metallic lines is transmitted through the polarizer. Light with different linear polarizations is reflected. The angle of the line pattern relative to the light leaving quantum cascade laser 11 is set by an actuator that causes the wire-grid polarizer to rotate about a shaft. An exemplary actuator and a shaft are labeled at 65 and 66, respectively. To simplify the drawing, the control wiring to quantum cascade laser 11 and the wire-grid polarizers have been omitted from the drawing.

The fraction of the light that passes through each polarizer depends on the angle between the pass direction of the polarizer and the direction of linear polarization. The direction of polarization of the light leaving variable attenuator 11a is set by the direction of polarization of wire-grid polarizer 64. The level of attenuation is determined by the combined attenuations provided by both wire-grid polarizers. The pass direction of each wire grid polarizer must not be orthogonal to the direction of polarization of the light impinging on the wire grid polarizer. Hence, two wire grid polarizers are needed if both the attenuation and direction of polarization of the light beam are to be controlled.

The light that is not passed by each of the wire-grid polarizers is reflected. It is advantageous to utilize an arrangement in which the reflected light is prevented from entering the optical chain of the imaging system. For example, light reflected by wire-grid polarizer 64 toward wire grid polarizer 66 could be re-reflected back toward wire-grid polarizer 64. A portion of that light could pass through wire-grid polarizer 64 and enter the optical train. In one aspect of the invention, the angle of the plane of the substrate on which the metallic lines are deposited relative to the beam direction of quantum cascade laser 11 is different from 90 degrees to prevent light reflected from the wire-grid polarizers from entering the optical chain. In one exemplary embodiment, the plane of the substrates is set at an angle between 3 and 6 degrees. However, other angles could be utilized. If the angle is too great, the size of the wire-grid polarizers must be increased. Since the substrates must be made from a material that is transparent to MIR light over wide range of wavelengths, cost considerations favor smaller angles.

The above-described embodiments of the present invention have been provided to illustrate various aspects of the invention. However, it is to be understood that different aspects of the present invention that are shown in different specific embodiments can be combined to provide other embodiments of the present invention. In addition, various modifications to the present invention will become apparent from the foregoing description and accompanying drawings.

Accordingly, the present invention is to be limited solely by the scope of the following claims.

What is claimed is:

1. An apparatus comprising:
    a variable attenuator adapted to receive a light beam generated by an MIR laser and that generates an attenuated light beam therefrom characterized by an attenuation level;
    a stage adapted to carry a specimen to be scanned said stage moving said specimen in a first direction;
    an optical assembly that focuses said attenuated light beam to a point on said specimen, said optical assembly comprising an objective lens that focuses said attenuated light beam to said point and a mirror that is fixed with respect to said objective lens and that directs said light beam into said objective lens, said objective lens and said mirror moving together in a second direction that is orthogonal to said first direction;
    a light detector that measures an intensity of light leaving said point on said specimen, said light detector being characterized by a detector dynamic range; and
    a controller that forms a plurality of line MIR images from said intensity as a function of position on said specimen, each line image comprising a plurality of pixels, each pixel value being indicative of a reflectivity of said specimen at a corresponding point on said specimen, wherein for at least one position of said stage, multiple line MIR images are formed without changing said one position of said stage with a different level of attenuation of said light beam for each of said line MIR images, said controller combining said plurality of line MIR images to generate a combined MIR line image having a dynamic range greater than said detector dynamic range.

2. The apparatus of claim 1 wherein said combined MIR image excludes pixels associated with intensities that are outside said detector dynamic range.

3. The apparatus of claim 1 wherein said controller averages pixels derived from a location on said specimen in different ones of said plurality of MIR images if said pixels correspond to intensity values that are within said detector dynamic range to generate said combined MIR image.

4. The apparatus of claim 1 wherein said controller sets said attenuation level in a second one of said plurality of line MIR images based on pixels that are outside of said detector dynamic range in a first one of said plurality of line MIR images that has already been formed.

5. The apparatus of claim 1 wherein said variable attenuator comprises
    a first wire-grid polarization filter characterized by a first linear polarization pass direction and a first actuator for causing said first linear polarization pass direction to rotate relative to said light beam, said first wire-grid polarization filter being positioned such that said light beam passes through said first wire-grid polarization filter; and
    a second wire-grid polarization filter characterized by a second linear polarization pass direction and a second actuator for causing said second linear polarization pass direction to rotate relative to said light beam, said second wire-grid polarization filter being positioned such that said light beam passes through said second wire-grid polarization filter after passing through said first wire-grid polarization filter.

6. The apparatus of claim 5 wherein said first wire-grid polarization filter comprises a parallel grid of metallic lines on a first transparent planar substrate, said first transparent planar substrate being angled relative to said light beam such that light reflected from said first wire-grid polarization filter does not propagate in a direction parallel to said light beam.

7. A method for generating an image of a specimen, said image comprising a two-dimensional array of pixels, each pixel representing a reflectivity of said specimen at an MIR wavelength at a corresponding point on said specimen, said method comprising:
    generating an attenuated MIR light beam characterized by an attenuation level from an MIR light beam;
    focusing said attenuated MIR light beam to a point on a specimen mounted on a stage that moves said specimen in a first direction;
    moving said point along a second direction on a linear path that is orthogonal to said first direction using a scanning assembly having a mirror and an objective lens that remains in a fixed relationship to said mirror, said scanning assembly moving in said second direction, said object lens focusing said attenuated MIR light beam to said point and collecting light reflective from said specimen at said point;
    measuring an intensity of light leaving said point on said specimen with a light detector characterized by a detector dynamic range;
    for at least one position of said specimen on said stage, forming a plurality of line MIR images along said linear path from said intensity as a function of position on said specimen without altering said stage position, each of said plurality of line MIR images being formed with a different level of attenuation of said MIR light beam; and combining said plurality of line MIR images to generate a combined line MIR image corresponding to said stage position, said combined line MIR image having a dynamic range greater than said detector dynamic range; and
    combining a plurality of said line MIR images for different positions of said stage to form a two-dimensional MIR image of said specimen.

8. The method of claim 7 wherein each of said plurality of line MIR images comprises a plurality of pixels, each pixel being characterized by an intensity value that is either within said detector dynamic range or outside said detector dynamic range, said combined linear MIR image excluding pixels that are outside said detector dynamic range.

9. The method of claim 7 wherein combining said combined linear MIR images comprises averaging pixels derived from a location on the specimen in different ones of said plurality of MIR images if said pixels correspond to intensity values that are within said detector dynamic range to generate said combined MIR image.

10. The method of claim 7 wherein said plurality of line MIR images comprises a first line MIR image and a second line MIR image and wherein said attenuation level in said second line MIR image is set based on pixels that are outside of said detector dynamic range in said first line MIR image.

11. The method of claim 7 wherein said generating an attenuated light beam comprises passing said MIR light beam through first and second wire-grid polarization filters, said first wire-grid polarization filter being characterized by a first linear polarization pass direction and a first actuator for causing said first linear polarization pass direction to rotate relative to said light beam, said first wire-grid polarization filter being positioned such that said light beam passes through said first wire-grid polarization filter, and
    said second wire-grid polarization filter being characterized by a second linear polarization pass direction and a second actuator for causing said second linear polarization pass direction to rotate relative to said light beam, said second wire-grid polarization filter being positioned such that said light beam passes through said second wire-grid polarization filter after passing through said first wire-grid polarization filter.

12. The method of claim 11 wherein said first wire-grid polarization filter comprises a parallel grid of metallic lines on a first transparent planar substrate, said first transparent planar substrate being angled relative to said light beam such that light reflected from said first wire-grid polarization filter does not propagate in a direction parallel to said light beam.

\* \* \* \* \*